United States Patent
Menezo et al.

(10) Patent No.: US 9,673,906 B2
(45) Date of Patent: Jun. 6, 2017

(54) DEVICE FOR AMPLITUDE MODULATION OF AN OPTICAL SIGNAL

(71) Applicant: Commissariat a l'energie atomique et aux energies alternatives, Paris (FR)

(72) Inventors: Sylvie Menezo, Voiron (FR); Olivier Dubray, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/960,876

(22) Filed: Dec. 7, 2015

(65) Prior Publication Data
US 2016/0164613 A1 Jun. 9, 2016

(30) Foreign Application Priority Data
Dec. 8, 2014 (FR) ...................... 14 62073

(51) Int. Cl.
*H04B 10/54* (2013.01)
*H04B 10/516* (2013.01)
*H04B 10/556* (2013.01)
*G02F 1/225* (2006.01)
*G02F 1/015* (2006.01)

(52) U.S. Cl.
CPC ......... *H04B 10/5161* (2013.01); *G02F 1/225* (2013.01); *H04B 10/54* (2013.01); *H04B 10/541* (2013.01); *H04B 10/5561* (2013.01); *G02F 2001/0155* (2013.01); *G02F 2201/126* (2013.01)

(58) Field of Classification Search
CPC .................................................. H04B 10/541
See application file for complete search history.

(56) References Cited

U.S. PATENT DOCUMENTS

| 8,649,687 B2* | 2/2014 | Djupsjobacka .... H04B 10/5051 398/182 |
| 2008/0231933 A1 | 9/2008 | Doerr |
| 2011/0158577 A1 | 6/2011 | Doerr |
| 2013/0195394 A1* | 8/2013 | Hosokawa ......... H04B 10/5053 385/3 |
| 2014/0003761 A1 | 1/2014 | Dong |

(Continued)

FOREIGN PATENT DOCUMENTS

FR 3 010 196 A1 3/2015
WO WO 2014/068197 A1 5/2014

OTHER PUBLICATIONS

French Preliminary Search Report issued Nov. 3, 2015 in French Application 14 62073 filed on Dec. 8, 2014 (with English Translation of Categories of Cited Documents).

(Continued)

*Primary Examiner* — Shi K Li
(74) *Attorney, Agent, or Firm* — Oblon, McClelland, Maier & Neustadt, L.L.P.

(57) ABSTRACT

A photonic device for amplitude modulation of an optical signal, in which a source of the optical signal is coupled to an input waveguide separating through an optical splitter into two arms which recombine through an optical combiner in an output waveguide, wherein the arms are phase shifted by $\pi/2$ and each include an electro-optical amplitude modulator. The device may be adapted to modulate a wavelength multiplexed signal.

9 Claims, 5 Drawing Sheets

(56) References Cited

U.S. PATENT DOCUMENTS

2015/0063741 A1 3/2015 Menezo et al.
2015/0316829 A1 11/2015 Kazmierski et al.

OTHER PUBLICATIONS

Xiaotie Wu, et al., "A 20Gb/s NRZ/PAM-4 1V Transmitter in 40nm CMOS Driving a Si-Photonic Modulator in 0.13μm CMOS" ISSCC 2013/Session 7/Optical Transceivers And Silicon Photonics/7.7, IEEE International Solid-State Circuits Conference, 2013, 3 pgs.

Extended Search Report issued Mar. 11, 2016 in European patent Application No. 15198167.7 (with unedited computer-generated English translation).

Yuanyuan Lu, et al., "All-optical format conversions from NRZ to BPSK and QPSK based on nonlinear responses in silicon microring resonators", vol. 15, No. 21, Optics Express, Oct. 17, 2007, XP-002712592, pp. 14275-14282.

\* cited by examiner

DEVICE FOR AMPLITUDE MODULATION OF AN OPTICAL SIGNAL

TECHNICAL FIELD

The field of the invention is that of optical modulators, and more particularly that of modulators carrying out multi-level amplitude modulation of PAM (Pulse Amplitude Modulation) type.

STATE OF THE PRIOR ART

In the field of optical transmissions, multi-level modulation techniques are known. The information bits may be encoded on the amplitude and/or the phase of the field of the optical carrier.

When only the amplitude of the optical field, E, is modulated, the modulation technique is called PAM (Pulse Amplitude Modulation). Amplitude modulation alone makes it possible to generate a pure intensity modulation, without phase modulation of the optical field.

The modulation is called "On Off Keying" when only two optical intensity levels are generated: level 1 (ON) and level 0 (OFF). The information is then encoded on 1 bit. The modulation is called M-PAM, when M intensity levels are generated. The information is then encoded on N bits, with $M=2^N$, with $N \geq 1$. Thus, the 'symbols' are transmitted every 'T' seconds, each symbol transporting N bits. The rate transmitted is written N/T in Bits per Second.

On reception of a M-PAM optical transmission, a single photo-detector is used, followed by a digital-analogue converter making it possible to detect the different optical intensity levels transmitted (levels of each symbol transmitted), and thus the values of the N bits carried by each information symbol.

An implementation of such a modulation technique consists, by means of a digital-analogue converter, in converting N series ($M=2^N$) of binary bits (value 0 or 1) in parallel, into a series of analogue values which can take M possible levels. The output of the digital-analogue converter is then connected to an electro-optical intensity modulator. At the output of the modulator, the optical intensity of the light is modulated according to M optical intensity levels.

The use of a digital-analogue converter does not appear to be satisfactory particularly due to its consumption. It would thus be desirable to have a PAM modulation system not requiring a digital-analogue converter and which can carry out the multi-level encoding directly in the optical field.

The authors of the article "A 20Gb/s NRZ/PAM-4 1V Transmitter in 40 nm CMOS Driving a Si-Photonic Modulator in 0.13 μm CMOS" (DOI: 10.1109/ISSCC.2013.6487667 Conference: Solid-State Circuits Conference Digest of Technical Papers (ISSCC), 2013 IEEE International) have in this respect proposed a PAM-M modulation system constituted of a Mach Zehnder interferometer including, in each of the two arms, N phase modulation sections of different lengths ($M=2^N$) and an additional phase tuning section for tuning the phase difference between the 2 arms. Thus, in order to carry out a PAM-4 modulation, there is in each of the arms of the Mach Zehnder interferometer two phase modulation sections of different lengths and a phase tuning section. It is thus necessary to control in total the activation of four phase modulation sections. The different lengths of the phase modulation sections lead to different properties, particularly in terms of speed and transmission. This leads to different losses that it is necessary to equalise to guarantee good operation of the system.

DESCRIPTION OF THE INVENTION

The invention aims to propose an open PAM modulator architecture in the sense that different implementations thereof are possible making it possible to use different types of modulators, and particularly modulators of small size such as resonant ring modulators.

The invention proposes in order to achieve this a photonic device for amplitude modulation of an optical carrier, in which the power of the optical carrier is split through an optical power splitter into two arms which recombine through an optical power combiner, characterised in that the arms are phase shifted by π/2 and each include an electro-optical amplitude modulator.

Certain preferred but non-limiting aspects of this modulator are the following:

- the optical splitter is a 50:50 splitter;
- the electro-optical amplitude modulators are amplitude modulators without phase modulation;
- the electro-optical amplitude modulators each include an arrangement of two resonant rings in series and in push-pull configuration;
- the electro-optical amplitude modulators are Mach Zehnder modulators in push-pull configuration;
- it further includes a generator of control voltages of the electro-optical amplitude modulators, said generator being configured to apply to each of the modulators a control voltage depending on the value of a bit of a bit series associated with the modulator;
- the generator is configured to apply a control voltage at 0 or at a voltage Vmax to the modulator of one of the arms and to apply a control voltage at 0 or at Vmax/2 to the electro-optical amplitude modulator of the other arm;
- each arm includes a plurality of wavelength selective electro-optical amplitude modulators, the modulators of one of the arms each being tuned to a different wavelength which corresponds to the wavelength at which a modulator of the other of the arms is tuned.

BRIEF DESCRIPTION OF THE DRAWINGS

Other aspects, aims, advantages and characteristics of the invention will become clearer on reading the following detailed description of preferred forms of embodiment thereof, given by way of non-limiting example, and made with reference to the appended drawings in which.

DETAILED DESCRIPTION OF PARTICULAR EMBODIMENTS

Figure 1:
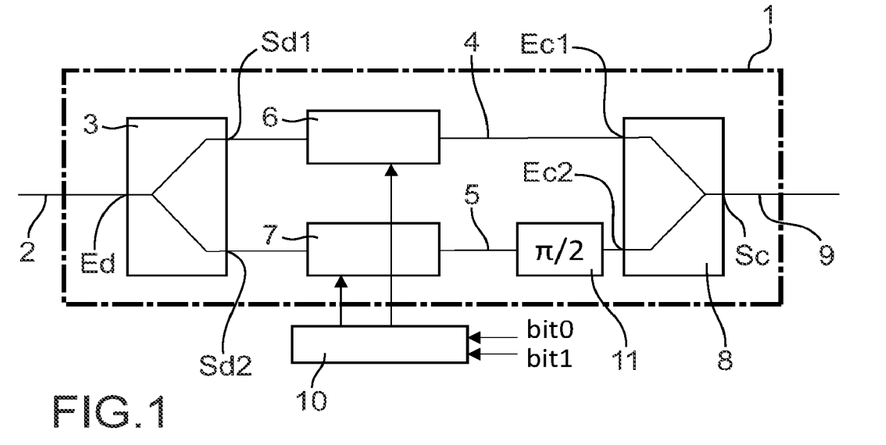
FIG. 1 is a diagram representing a device according to the invention.

With reference to FIG. 1, the invention relates to a photonic device 1 making it possible to encode an information flow by amplitude modulation of an optical carrier. This device for amplitude modulation of an optical carrier is designated PAM modulator hereafter and makes it possible to carry out a PAM-4 modulation on an input optical carrier of wavelength $\lambda_0$. The optical carrier at the output of the PAM 1 modulator has an intensity level among four possible optical intensity levels, said intensity level being dependent on the value of a digital signal encoded on two bits bit1, bit0.

The PAM 1 modulator includes an optical power splitter 3 having an input Ed which can be coupled, in guided optics, to an input waveguide 2 to receive the input optical carrier of wavelength $\lambda_0$, to modulate in amplitude. The splitter 3 has a pair of outputs Sd1, Sd2. The optical splitter 3 is a 50:50 splitter supplying on each of these outputs Sd1, Sd2 50% of the optical power of the input optical carrier.

At the output of the splitter 3, the optical fields $E_{4in}$, $E_{5in}$ on each of the outputs Sd1, Sd2 are the following, considering that the splitter is without losses:

$$E_{4in} = \sqrt{\frac{P_{in}}{2}}, E_{5in} = \sqrt{\frac{P_{in}}{2}}$$

with $P_{in}$ the power of the optical carrier at the input of the splitter 3.

Each of the outputs Sd1, Sd2 of the splitter 3 is coupled to an input of a modulator 6, 7. The output of each of the modulators 6, 7 is coupled to an input EC1, EC2 of an optical power combiner 8. The combiner 8 has an output Sc on which is found the amplitude modulated output optical carrier. An output waveguide 9 may be coupled to the output Sc of the combiner 8 to assure, in guided optics, the propagation of the modulated optical signal.

The modulators 6, 7 are electro-optical amplitude modulators, and more particularly modulators carrying out a modulation of the amplitude of the optical field without phase modulation (so-called "chirp free" modulators).

The modulators 6, 7 are identical. They thus have similar losses. Since the losses in the two arms are strictly well balanced, it is not necessary to provide for means dedicated to their equalisation.

An arm 4, respectively 5, moreover also known as optical path, connects the output port Sd1, respectively Sd2, of the splitter 3, to the input port Ec1, respectively Ec2, of the combiner 8, through the intermediary of the modulator 6, respectively 7. The optical paths may be realised in free optics, or instead in guided or fibre optics.

One of the arms, the arm 5 in the example of FIG. 1, further comprises an optical phase shifter 11 making it possible to phase shift by $\pi/2$ the optical carriers propagating respectively in the arms 4 and 5.

A generator 10 of control voltages of the modulators 6 and 7 receives at the input the digital signal to transmit encoded on two bits, i.e. two series of bits to transmit: bit series 'bits0' and bit series 'bits1'. The generator 10 generates control voltages of the modulators 6 and 7 which are dependent on the value of the bits of the series 'bits0' and of the series 'bits1' respectively:

thus, for the modulator 6, a first control voltage is generated which may take two levels $V_{A_h}$ and $V_{A_b}$ corresponding respectively to a bit of value "1" or of value "0" of the bit series 'bits0';

thus, for the modulator 7, a second control voltage is generated which may take two levels $V_{B_h}$ and $V_{B_b}$ corresponding respectively to a bit of value "1" or of value "0" of the bit series 'bits1'.

The generator of control voltages 10 thus has a control law for each of the modulators 6, 7 able to define the control voltage to apply to each of the modulators 6, 7 depending on the value of the bits of the series 'bits0' and 'bits1'. These control laws are characterised by two levels of voltages: $V_{A_h}$, $V_{A_b}$ for the amplitude modulator 6 (called first modulator) and $V_{B_h}$, $V_{B_b}$ for the amplitude modulator 7 (called second modulator).

The invention in this respect also relates to a method for amplitude modulation of an optical carrier, including the generation and the application, to each of the electro-optical amplitude modulators of the device according to the invention, of a control voltage depending on the value of a bit of a bit series bits0, bits1 to transmit.

The PAM 1 modulator according to the invention thus takes the form of a Mach Zehnder interferometer of which the two arms 4, 5 are phase shifted by $\pi/2$ and each include an amplitude modulator 6, 7. The PAM 1 modulator implements a PAM-4 modulation i.e. 4 levels of amplitude of the optical field, without phase change between the 4 levels of amplitude, and thus corresponding to 4 distinct intensity levels of the optical wave. This results in a single amplitude modulation section per arm.

The amplitude modulators 6, 7 may be electro-absorption modulators. Alternatively, the amplitude modulators 6, 7 may be modulators in push-pull configuration, for example Mach Zehnder modulators in push-pull configuration, or even modulators taking the form of an arrangement of two resonant rings in series in push-pull configuration such as for example described in the French patent application filed on Sep. 2, 2013 and published on the Mar. 6, 2015 under n° 3 010 196. The push-pull configuration makes it possible to eliminate chirp since the chirp introduced into one of the arms of a Mach Zehnder modulator, respectively into one of the rings in series, is compensated by the chirp introduced into the other of the arms, respectively into the other of the rings.

Figure 5A:
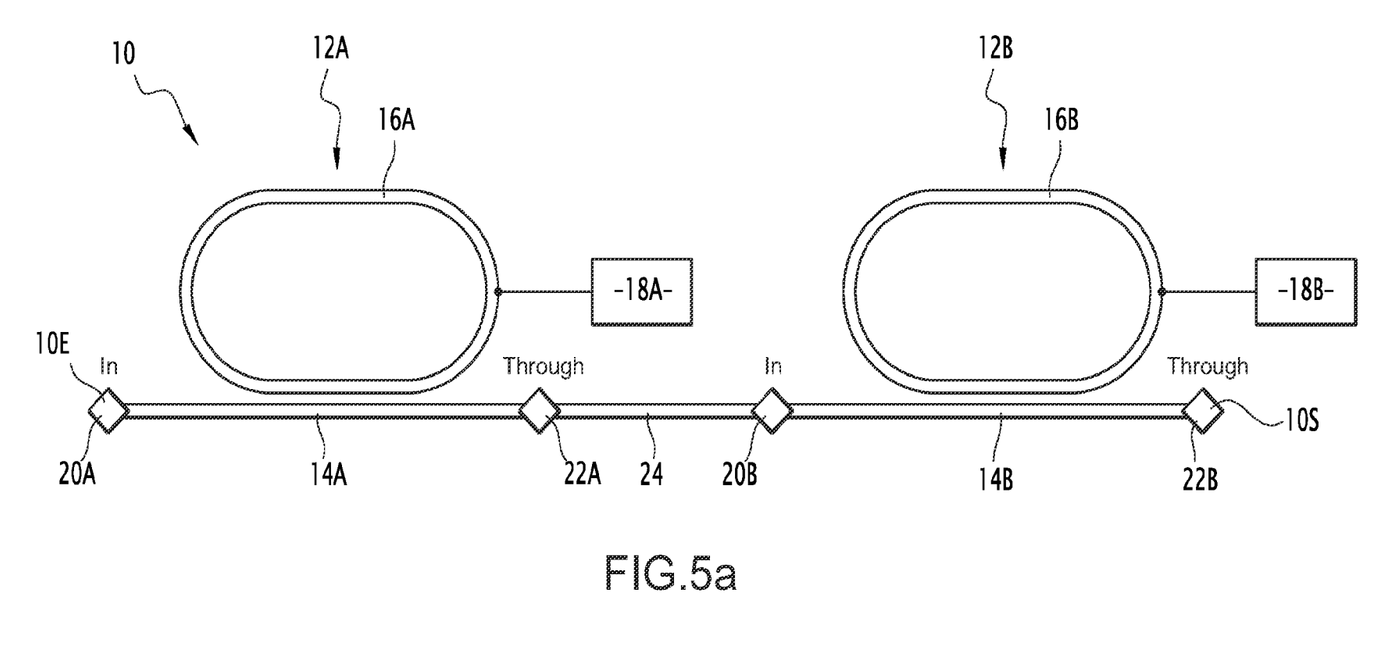
FIGS. 5a and 5b represent two possible embodiments of an amplitude modulator in the form of an arrangement of two resonant rings in series and in push-pull configuration being able to be used in the device according to the invention.
Figure 5B:
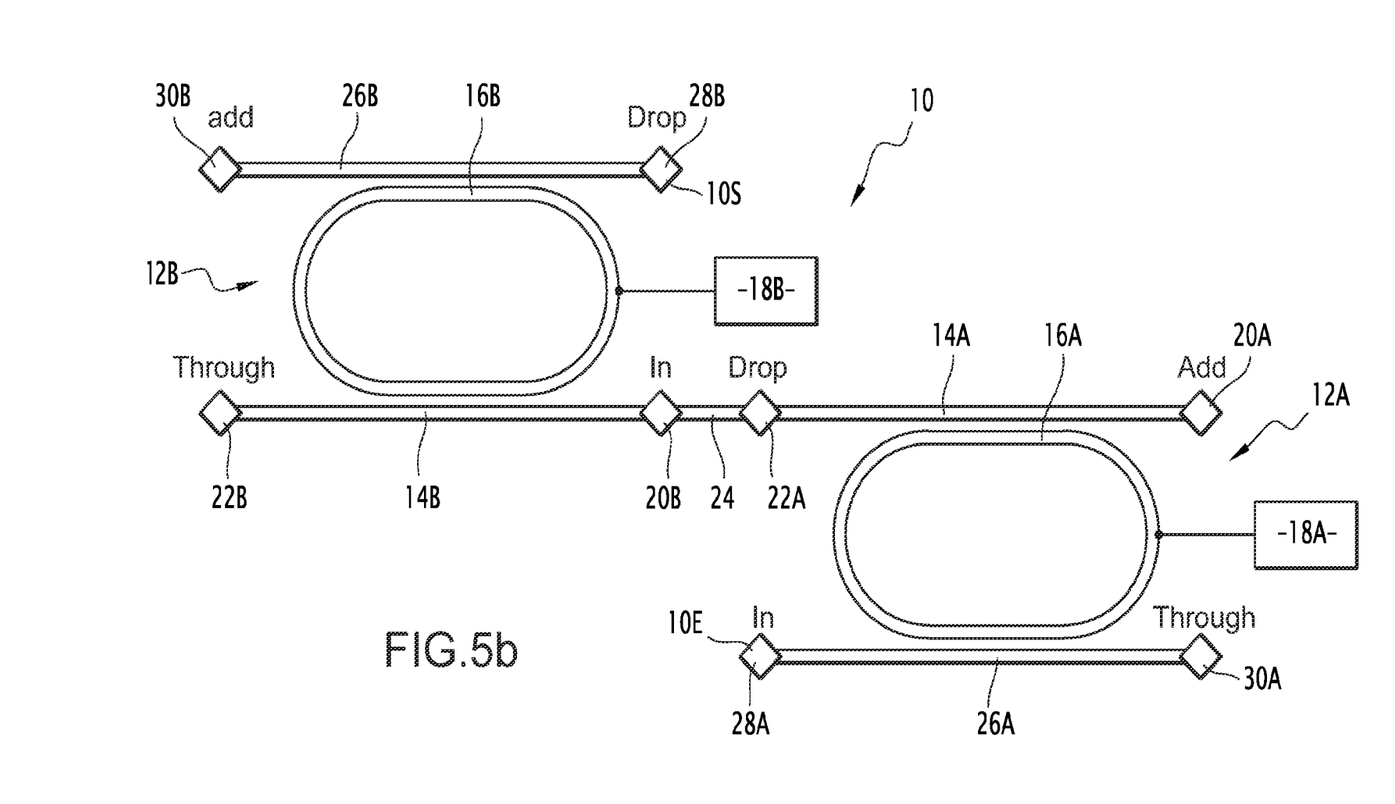

The use of modulators taking the form of an arrangement of two resonant rings in series and in push-pull configuration is favoured, particularly due to their reduced size. Two examples of embodiment of such a modulator where the chirp introduced to a first ring is compensated by the chirp introduced to the second ring are represented in FIGS. 5a and 5b.

The modulator 10 comprises a first resonant ring modulator 12A and a second resonant ring modulator 12B.

The first modulator 12A comprises a first waveguide 14A, a first ring waveguide 16A, called first ring 16A and a first control device 18A.

The first waveguide 14A has an input 20A and an output 22A. The shape of the first waveguide 14A is any shape. In the case of FIG. 1, by way of example, the input 20A is the port In and the output 22A is the port Through.

The first ring 16A is optically coupled to the first waveguide 14A.

The first ring 16A has a first effective index Neff1.

The first control device 18A is suited to modulating the first effective index Neff1 of the first ring 16A according to a first control law L1.

Similarly, the second modulator 12B comprises a second waveguide 14B, a second ring waveguide 16B, called second ring 16B and a second control device 18B.

The second waveguide 14B has similar properties to the properties described for the first waveguide 14A. In particular, the second waveguide 14B has an input 20B and an output 22B.

The input 20B of the second waveguide 14B is connected to the output 22A of the first waveguide 14A. Such a property enables the optical signal at the output of the modulator 10 to be influenced both by the first ring 16A and the second ring 16B.

The second control device 18B is suited to modulating the second effective index Neff2 of the second ring 16B according to a second control law L2.

Several configurations are possible to connect the input 20B of the second waveguide 14B to the output 22A of the first waveguide 14A.

In the case of FIG. 5a, by way of example, the input 20B of the second waveguide 14B is the port In of the second modulator 12B and the output 22B of the second waveguide 14B is the port Through of the second modulator 12B. The modulator 10 includes an intermediate waveguide 24. The intermediate waveguide 24 connects the port In 20B of the second waveguide 14B to the port Through 22A of the first waveguide 14A. In this configuration, the input 10E of the modulator 10 is the port In 20A of the first modulator 12A and the output 10S of the modulator 10 is the port Through 22B of the second modulator 12B.

According to a second configuration illustrated by FIG. 5b, each modulator 12A, 12B comprises two waveguides each optically coupled to their respective ring 16A, 16B. Thus, the first resonant ring modulator 12A comprises the first waveguide 14A which extends between the port Add 20A and the port Drop 22A and the third waveguide 26A which extends between the port In 28A and the port Through 30A. Similarly, the second resonant ring modulator 12B comprises the second waveguide 14B which extends between the port In 20B and the port Through 22B and the fourth waveguide 26B which extends between the port Drop 28B and the port Add 30B. The modulator 10 includes, also, an intermediate waveguide 24 connecting the port Drop 22A of the first modulator 12A to the port In 20B of the second modulator 14B. In this second configuration, the input 10E of the modulator 10 is the port In 28A of the first modulator 12A and the output 10S of the modulator 10 is the port Add 30B of the second modulator 12B.

According to a third configuration, not represented, the first waveguide 14A and the second waveguide 14B are merged. In this third configuration, the input 10E of the modulator 10 is both the port In of the first modulator 15 12A and the port In of the second modulator 12B whereas the output 10S of the modulator 10 is both the port Through of the first modulator 12A and the port Through of the second modulator 12B.

In these three configurations, each time, the input 20B of the second waveguide 14B is connected to the output 22A of the first waveguide 14A.

Identical ring modulators 12A, 12B, that is to say modulators having identical coupling parameters, are preferably chosen. The first control law L1 and the second control law L2 are then chosen such that when the first effective index Neff1 varies by a first quantity ΔNeff1, the second effective index Neff2 varies by a second quantity ΔNeff2 opposite to the first quantity −ΔNeff1. By way of example, the control laws L1 and L2 are two modulation voltages reproducing the bit series to transmit in phase opposition. Hence, the two modulators 12A and 12B are said to be push-pull modulated. For such control laws, in operation, the modulator 10 is such that the chirp parameter introduced by the first modulator 12A is opposite to the chirp parameter introduced by the second modulator 12B. The modulator 10 is thus capable of supplying at the output a modulated optical signal of which the phase is not modulated.

The calculation is detailed hereafter making it possible to determine the control voltage $V_{A_h}$, $V_{A_b}$ (respectively $V_{B_h}$, $V_{B_b}$) laws to apply to the first modulator 6 (respectively the second modulator 7), in order to obtain, at the output of the PAM 1 modulator, 4 distinct intensity levels, without phase modulation of the optical carrier at the input.

At the output of the first modulator 6, the two levels of amplitude of the optical fields associated with the voltages $V_{A_h}$ and $V_{A_b}$ are noted $E_{6h}$ and $E_{6b}$:

$$E_{6h} = A_h * E_{4in}$$

$$E_{6b} = A_b * E_{4in}$$

Where $A_h$ and $A_b$ are real constants representing the amplitude modulation ratios of the first modulator 6.

At the output of the second modulator 7, the two levels of the optical fields associated with the voltages $V_{B_h}$ and $V_{B_b}$ are noted $E_{7h}$ and $E_{7b}$:

$$E_{7h} = B_h * E_{5in}$$

$$E_{7b} = B_b * E_{5in}$$

Where $B_h$ and $B_b$ are real constants representing the amplitude modulation ratios of the second modulator 7.

At the output of the PAM 1 modulator, the 4 levels of amplitude of the optical carrier $E_{level1}$, $E_{level2}$, $E_{level3}$, $E_{level4}$ obtained are written as follows:

$$E_{level1} = \left(A_h + \exp\left(j \cdot \frac{\pi}{2}\right) * B_h\right) * \frac{\sqrt{P_{in}}}{2}$$

$$E_{level2} = \left(A_h + \exp\left(j \cdot \frac{\pi}{2}\right) * B_b\right) * \frac{\sqrt{P_{in}}}{2}$$

$$E_{level3} = \left(A_b + \exp\left(j \cdot \frac{\pi}{2}\right) * B_h\right) * \frac{\sqrt{P_{in}}}{2}$$

$$E_{level4} = \left(A_b + \exp\left(j \cdot \frac{\pi}{2}\right) * B_b\right) * \frac{\sqrt{P_{in}}}{2}$$

Where $\exp\left(j \cdot \frac{\pi}{2}\right)$ represents the phase shifting brought about by the phase shifter 11.

The 4 levels of amplitude of the optical carrier at the output of the PAM 1 modulator $E_{level1}$, $E_{level2}$, $E_{level3}$, $E_{level4}$ correspond respectively to 4 levels of optical powers $P_{level1}$, $P_{level2}$, $P_{level3}$, $P_{level4}$:

$$P_{level1} = (A_h^2 + B_h^2) * \frac{P_{in}}{4}$$

$$P_{level2} = (A_h^2 + B_b^2) * \frac{P_{in}}{4}$$

$$P_{level3} = (A_b^2 + B_h^2) * \frac{P_{in}}{4}$$

$$P_{level4} = (A_b^2 + B_b^2) * \frac{P_{in}}{4}$$

In order to carry out a PAM-4 modulation in which the 4 intensity levels are identically spaced, one of the following equalities must be respected:

$$P_{level1} = 0.75 * \frac{P_{in}}{2}, P_{level2} = 0.5 * \frac{P_{in}}{2}, P_{level3} = 0.25 * \frac{P_{in}}{2}, P_{level4} = 0$$

or instead $$P_{level1} = \frac{P_{in}}{2}, P_{level2} = 0.75 * \frac{P_{in}}{2}, P_{level3} = 0.5 * \frac{P_{in}}{2}, P_{level4} = 0.25 * \frac{P_{in}}{2}$$

The solutions are respectively:

Solution 1: $A_h = 1, A_b = 0, B_h = \sqrt{\frac{1}{2}}, B_b = 0$, or

Solution 2: $A_h = 1, A_b = 0, B_h = 1, B_b = \sqrt{\frac{1}{2}}$.

Figure 2A:
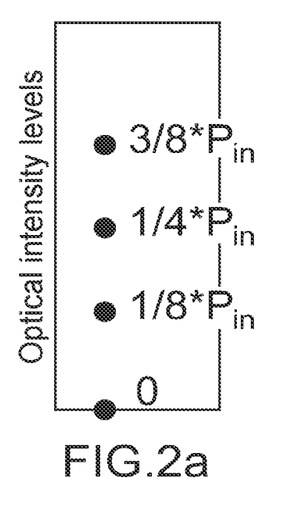
FIGS. 2a and 2b represent optical intensity levels at the output of a device according to the invention.
Figure 2B:
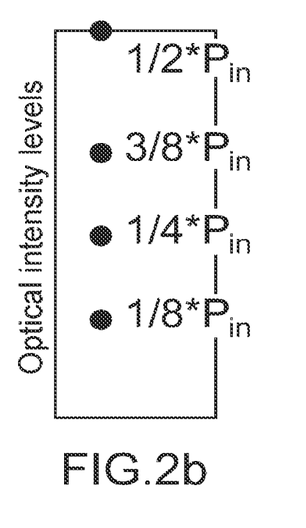

In FIGS. 2a and 2b are represented the different intensity levels which are able to be obtained at the output of the PAM 1 modulator, with 50% power splitting taken into consideration. FIG. 2a is associated with solution 1 above, FIG. 2b is associated with solution 2 above.

Thus, in an embodiment of the invention aimed at a PAM-4 modulation with identically spaced intensity levels, the generator of control voltages 10 is configured (solution 1):

when the value of the bit of the series 'bit0' is "1", respectively "0", to generate a first control voltage $V_{A_h}$, respectively $V_{A_b}$, such that the first modulator 6 modifies the amplitude of the optical carrier according to an output/input ratio of 1, respectively 0;

when the value of the bit of the series 'bit1' is "1", respectively "0", to generate a second control voltage $V_{B_h}$, respectively $V_{B_b}$, such that the second modulator 7 modifies the amplitude of the optical carrier according to an output/input ratio of $$\sqrt{\frac{1}{2}},$$

respectively 0.

And, in another possible embodiment of the invention aimed at a PAM-4 modulation with identically spaced intensity levels, the generator of control voltages 10 is configured (solution 2):

when the value of the bit of the series 'bit0' is "1", respectively "0", to generate a first control voltage $V_{A_h}$, respectively $V_{A_b}$, such that the first modulator 6 modifies the amplitude of the optical carrier according to an output/input ratio of 1, respectively 0;

when the value of the bit of the series 'bit1' is "1", respectively "0", to generate a second control voltage $V_{B_h}$, respectively $V_{B_b}$, such that the second modulator 7 modifies the amplitude of the optical carrier according to an output/input ratio of 1, respectively $$\sqrt{\frac{1}{2}}.$$

A way is described hereafter of determining the control voltage levels $V_{A_h}$, $V_{A_b}$ of the first modulator 6, and the control voltage levels $V_{B_h}$, $V_{B_b}$ of the second modulator 7 which make it possible to generate the output/input amplitude ratio $A_h$, $A_b$, $B_h$ and $B_b$, in an embodiment example of the invention where the amplitude modulators 6, 7 are Mach Zehnder modulators in push-pull configuration.

Figure 3:
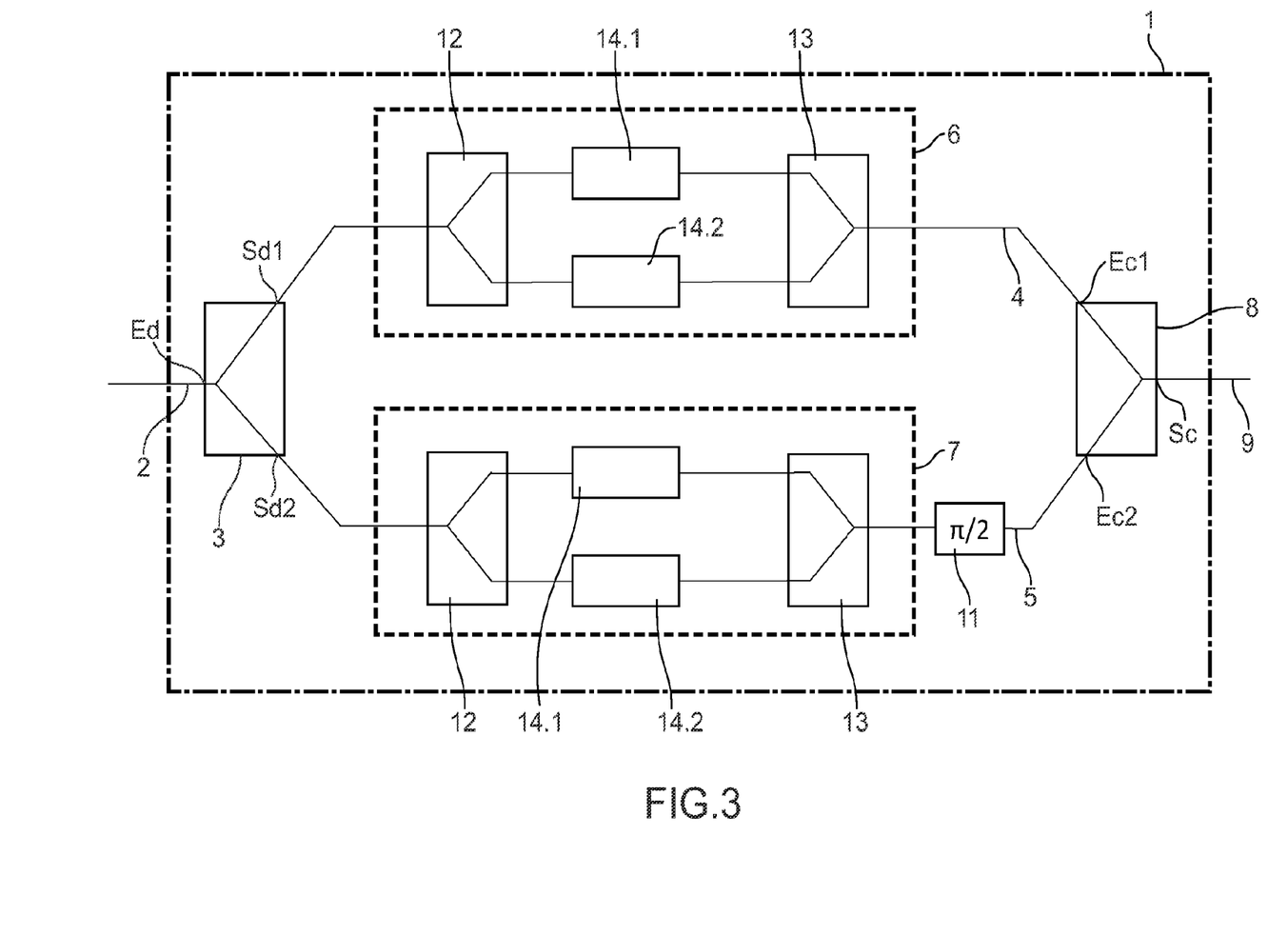
FIG. 3 is a diagram of a device according to an embodiment of the invention using Mach Zehnder interferometers as amplitude modulators.

This embodiment example is illustrated in FIG. 3. Each Mach Zehnder modulator 6, 7 is composed of an optical intensity splitter 12 (splitter 1 input to 2 outputs, 50:50), of an optical intensity combiner 13 (2 inputs to 1 output) and, in each arm of the Mach Zehnder modulator, an optical phase modulation section 14-1, 14-2.

When the optical phase modulation section 14-1 of one arm sees a voltage $V_1$ applied, the optical phase modulation section 14-2 of the other arm sees a voltage $V_2$ applied such that $V_1 = -V_2$ (use in push-pull configuration). Thus, it may be considered that the control voltage of an amplitude modulator 6, 7 is the following $$V_{in} = -\frac{V_2(t)}{2} = \frac{V_1(t)}{2}.$$

The transfer function of a Mach Zehnder modulator 6, 7 in push-pull configuration is given below:

$$P_{out\_mod}(t) = \cos^2\left(\frac{V_{in}(t)}{2V_\pi}\pi\right) * P_{in\_mod}$$

$$E_{out\_mod}(t) = \cos\left(\frac{V_{in}(t)}{2V_\pi}\pi\right) * E_{in\_mod}$$

With $E_{out\_mod}$ and $E_{in\_mod}$ the amplitudes of the optical carrier at the output/input of the modulator 6,7, $P_{out\_mod}$ and $P_{in\_mod}$ the optical powers of the optical carrier at the output/input of the modulator 6,7, $V_\pi$ the voltage required to produce a phase shift of π in the phase modulation sections 14-1, 14-2, $V_{in}$ the control voltage of the modulator 6, 7 which varies between [0, $V_\pi$].

At the output of the PAM 1 modulator of FIG. 3, the optical amplitude and the optical intensity are calculated as previously:

$$E_{out} = \frac{1}{2}\left(\cos\left(\frac{V_{inA}}{2*V_\pi}\pi\right)*j + \cos\left(\frac{V_{inB}}{2*V_\pi}\pi\right)\right)*E_{in}$$

$$P_{out} = \frac{1}{4}\left(\cos^2\left(\frac{V_{inA}}{2*V_\pi}\pi\right) + \cos^2\left(\frac{V_{inB}}{2*V_\pi}\pi\right)\right)*P_{in}$$

With $E_{out}$ and $E_{in}$ the amplitudes of the optical carrier at the output/input of the PAM-4 modulator, $P_{out}$ and $P_{in}$ the optical powers of the optical carrier at the output/input of the PAM 1 modulator, $V_\pi$ the voltage required to produce a phase shift of π in the phase modulation sections 14-1, 14-2, $V_{inA}$ the control voltage of the first modulator 6 which varies in the range [0, $V_\pi$], $V_{inB}$ the voltage of the second modulator 7 which varies in the range [0, $V_\pi$].

In order to create 4 identically spaced intensity levels, the two possible solutions are the following.

Solution 1: $A_h = \cos\left(\frac{V_{inAh}}{2*V_\pi}\pi\right) = 1$, $A_b = \cos\left(\frac{V_{inAb}}{2*V_\pi}\pi\right) = 0$, $B_h = \cos\left(\frac{V_{inBh}}{2*V_\pi}\pi\right) = \sqrt{\frac{1}{2}}$, $B_b = \cos\left(\frac{V_{inBb}}{2*V_\pi}\pi\right) = 0$ Solution 2: $A_h = \cos\left(\frac{V_{inAh}}{2*V_\pi}\pi\right) = 1$, $A_b = \cos\left(\frac{V_{inAb}}{2*V_\pi}\pi\right) = \sqrt{\frac{1}{2}}$, $B_h = \cos\left(\frac{V_{inBh}}{2*V_\pi}\pi\right) = 1$, $B_b = \cos\left(\frac{V_{inBb}}{2*V_\pi}\pi\right) = 0$ With $V_{inAh}$ the control voltage of the first modulator 6 when the value of the bit of the bit series0 is 1, and $V_{inAb}$ the control voltage of the first modulator 6 when the value of the bit of the bit series0 is 0, With $V_{inBh}$ the control voltage of the second modulator 7 when the value of the bit of the bit series1 is 1, and $V_{inBb}$ the control voltage of the second modulator 7 when the value of the bit of the bit series1 is 0.

The control voltages are then the following.

Solution 1: $V_{inAh} = 0$, $V_{inAb} = V_\pi$, $V_{inBh} = \frac{V_\pi}{2}$, $V_{inBb} = 0$, making it possible to obtain output levels:

$P_{level1} = 0.75*P_{in}$ (application of $V_{inAh}$ and $V_{inBh}$), $P_{level2} = 0.5*P_{in}$ (application of $V_{inAh}$ and $V_{inBb}$), $P_{level3} = 0.25*P_{in}$ (application of $V_{inAb}$ and $V_{inBh}$), $P_{level4} = 0$ (application of $V_{inAb}$ and $V_{inBb}$).

Solution 2: $V_{inAh} = 0$, $V_{inAb} = \frac{V_\pi}{2}$, $V_{inBh} = 0$, $V_{inBb} = V_\pi$ making it possible to obtain output levels:

$P_{level1} = P_{in}$ (application of $V_{inAh}$ and $V_{inBh}$)

$P_{level2} = 0.75*P_{in}$ (application of $V_{inAh}$ and $V_{inBb}$), $P_{level3} = 0.5*P_{in}$ (application of $V_{inAb}$ and $V_{inBh}$), $P_{level4} = 0.25*P_{in}$ (application of $V_{inAb}$ and $V_{inBb}$).

Thus, in a possible embodiment of the invention aimed at a PAM-4 modulation with identically spaced intensity levels, the generator 10 is configured (solution 1):
when the value of the bit of the bit series0 is "1", respectively "0", to apply to the first modulator 6 a control voltage at 0, respectively at $V_\pi$, to modify the amplitude of the optical carrier according to an output/input ratio of 1, respectively 0;
when the value of the bit of the bit series1 is "1", respectively "0", to apply to the second modulator 7 a control voltage at vπ/2, respectively 0, to modify the amplitude of the optical carrier according to an output/input ratio of $\sqrt{\frac{1}{2}}$, respectively 0.

This control law is summarised in the table below.

| bit0 | bit1 | Control voltage of the first modulator 6 | Modulation ratio of the first modulator 6 | Control voltage of the second modulator 7 | Modulation ratio of the second modulator 7 | Output level |
|---|---|---|---|---|---|---|
| 0 | 0 | $V_\pi$ | 0 | 0 | 0 | 0 |
| 0 | 1 | $V_\pi$ | 0 | $\frac{V_\pi}{2}$ | $\sqrt{\frac{1}{2}}$ | 0.25 * Pin |
| 1 | 0 | 0 | 1 | 0 | 0 | 0.5 * Pin |
| 1 | 1 | 0 | 1 | $\frac{V_\pi}{2}$ | $\sqrt{\frac{1}{2}}$ | 0.75 * Pin |

And, in another possible embodiment of the invention aimed at a PAM-4 modulation with identically spaced intensity levels, the generator 10 is configured (solution 1):
when the value of the bit of the bit series0 is "1", respectively "0", to apply to the first modulator 6 a control voltage at 0, respectively at $V_\pi/2$, to modify the amplitude of the optical carrier according to an output/input ratio of 1, respectively 0;
when the value of the bit of the bit series1 is "1", respectively "0", to apply to the second modulator 7 a control voltage at 0, respectively $V_\pi$, to modify the amplitude of the optical carrier according to an output/input ratio of 1, respectively $\sqrt{\frac{1}{2}}$.

This control law is summarised in the table below.

| bit0 | bit1 | Control voltage of the first modulator 6 | Modulation ratio of the first modulator 6 | Control voltage of the second modulator 7 | Modulation ratio of the second modulator 7 | Output level |
|---|---|---|---|---|---|---|
| 0 | 0 | $\frac{V_\pi}{2}$ | 0 | $V_\pi$ | $\sqrt{\frac{1}{2}}$ | 0.25 * Pin |
| 0 | 1 | $\frac{V_\pi}{2}$ | 0 | 0 | 1 | 0.5 * Pin |
| 1 | 0 | 0 | 1 | $V_\pi$ | $\sqrt{\frac{1}{2}}$ | 0.75 * Pin |
| 1 | 1 | 0 | 1 | 0 | 1 | Pin |

In the two control laws, the amplitude modulator of one of the arms 4, 5 is controlled by a control voltage at 0 or at a voltage Vmax ($V_\pi$) and the amplitude modulator of the other of the arms is controlled by a control voltage at 0 or at Vmax/2, so as to make it possible to obtain a PAM-4 modulation with four identically spaced output levels.

Figure 4:
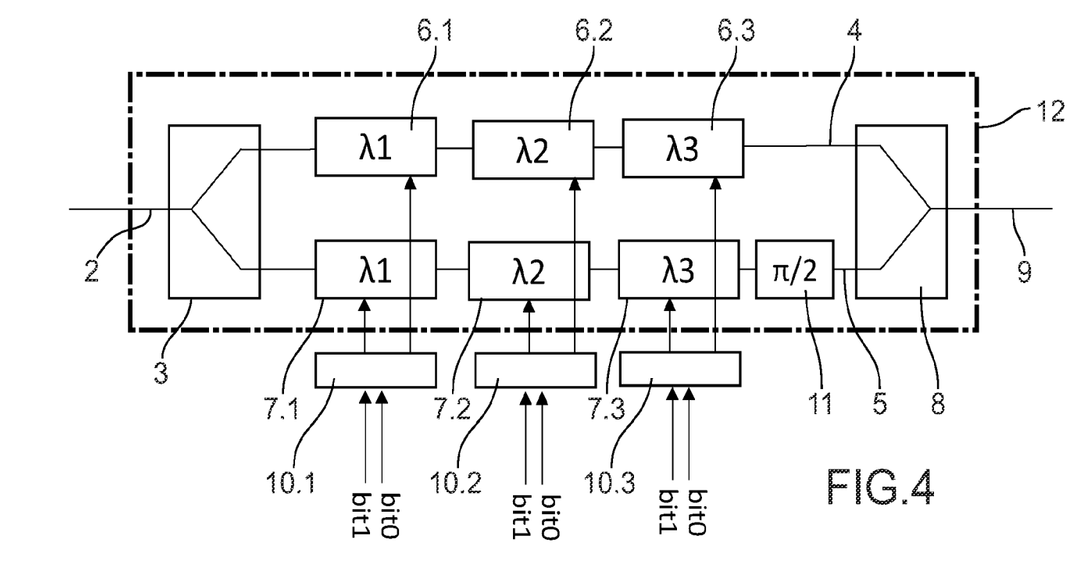
FIG. 4 is a diagram representing a variant of optical modulator according to the invention making it possible to apply a PAM amplitude modulation to a set of wavelength multiplexed optical carriers.

In a variant of the invention, the PAM modulator applies a PM-4 modulation to a set of wavelength multiplexed optical carriers, the optical carriers being of different wavelengths λ1, λ2, λ3.

In FIG. 4 is represented such a multi-wavelength PAM modulator 12. Its architecture is identical to that of the PAM modulator 1 discussed until now. It differs therefrom in that each modulation arm 4, 5 comprises a plurality of amplitude modulators 6-1, 6-2, 6-3 and 7-1, 7-2, 7-3 which are wavelength selective so as to only modulate a single of the wavelengths λ1, λ2, λ3, of the set of input wavelength multiplexed optical carriers. In the example of FIG. 4, there is thus on each of the arms 4, 5 a modulator 6-1, 7-1 selectively modulating the wavelength X1, a modulator 6-2, 7-2 selectively modulating the wavelength λ2 and a modulator 6-3, 7-3 selectively modulating the wavelength λ3. And there is a generator of control voltage 10-1, 10-2, 10-3 for each of the wavelengths λ1, λ2, λ3, charged with applying to each of the modulators 6-1, 7-1; 6-2, 7-2; 6-3, 7-3 with which it is associated a control voltage depending on the value of a bit of a corresponding bit series 'bit0', 'bit1'.

Within the scope of this variant, due to their good wavelength selectivity, amplitude modulators constituted by the arrangement of two resonant rings in series and in push-pull configuration are preferably used.

A multi-wavelength PAM modulation is thus carried out by means of a single Mach Zehnder interferometer. This variant thus proves to be advantageous, particularly by comparison with the PAM-M modulation system described in the article discussed in the introduction which would make it necessary to duplicate the Mach Zehnder interferometer carrying the multiple phase modulation sections for each of the wavelengths.

The invention claimed is:

1. A photonic device for amplitude modulation of an optical carrier, in which the power of the optical carrier is split through an optical power splitter into two arms which recombine through an optical power combiner, in which the arms are phase shifted by π/2 and each include an electro-optical amplitude modulator, further comprising a control voltages generator to apply to each of the electro-optical amplitude modulators a control voltage which depends on the value of a bit of a bit series associated with the electro-optical amplitude modulator, said control voltages generator being configured:
   when the bit of the bit series associated with the electro-optical amplitude modulator of one of the arms is of value 0, respectively 1, to apply a control voltage to said electro-optical amplitude modulator which modifies the amplitude of the optical carrier according to an output/input ratio of 0, respectively 1;
   when the bit of the bit series associated with the electro-optical amplitude modulator of the other of the arms is of value 0, respectively 1, to apply a control voltage to said electro-optical amplitude modulator of the other of the arms which modifies the amplitude of the optical carrier passing through the electro-optical amplitude modulator according to an output/input ratio of 0, respectively $$\sqrt{\frac{1}{2}},$$

or according to an output/input ratio of $$\sqrt{\frac{1}{2}},$$

respectively 1.

2. The device according to claim 1, in which the optical splitter is a 50:50 splitter.

3. The device according to claim 1, in which the electro-optical amplitude modulators are amplitude modulators without phase modulation.

4. The device according to claim 3, in which the electro-optical amplitude modulators each include an arrangement of two resonant rings in series and in push-pull configuration.

5. The device according to claim 3, in which the electro-optical amplitude modulators are electro-absorption modulators.

6. The device according to claim 3, in which the electro-optical amplitude modulators are Mach Zehnder modulators in push-pull configuration.

7. The device according to claim 1, in which the control voltages generator is configured to apply a control voltage at 0 or at a voltage Vmax to the electro-optical amplitude modulator of one of the arms and to apply a control voltage at 0 or at Vmax/2 to the electro-optical amplitude modulator of the other arm.

8. The device according to claim 1, in which each arm includes a plurality of wavelength selective electro-optical amplitude modulators, the electro-optical amplitude modulators of one of the arms each being tuned to one of a plurality of different wavelengths and the electro-optical amplitude modulators of the other of the arms each being tuned to one of said plurality of different wavelengths.

9. A method for amplitude modulation of an optical carrier, including the generation and the application, to each of the electro-optical amplitude modulators of the device according claim 1, of a control voltage depending on the value of a bit of a bit series to transmit,
   when the bit of the bit series associated with the electro-optical amplitude modulator of one of the arms is of value 0, respectively 1, the control voltage applied to said modulator modifies the amplitude of the optical carrier passing through the electro-optical amplitude modulator according to an output/input ratio of 0, respectively 1;
   when the bit of the bit series associated with the electro-optical amplitude modulator of the other of the arms is of value 0, respectively 1, the control voltage applied to said electro-optical amplitude modulator of the other of the arms modifies the amplitude of the optical carrier passing through the electro-optical amplitude modulator according to an output/input ratio of 0, respectively $$\sqrt{\frac{1}{2}},$$

or according to an output/input ratio of $$\sqrt{\frac{1}{2}},$$

of respectively 1.

* * * * *